(12) United States Patent
Iruvanti et al.

(10) Patent No.: US 12,254,314 B2
(45) Date of Patent: Mar. 18, 2025

(54) NATURAL LANGUAGE PROCESSING (NLP) ENABLED CONTINUOUS INTEGRATION AND CONTINUOUS DELIVERY (CICD) DEPLOYMENT

(71) Applicant: Bank of America Corporation, Charlotte, NC (US)

(72) Inventors: John Iruvanti, Telegana (IN); Komuraiah Kannaveni, Telegana (IN); Panduranga Dongle, Telegana (IN)

(73) Assignee: Bank of America Corporation, Charlotte, NC (US)

( * ) Notice: Subject to any disclaimer, the term of this patent is extended or adjusted under 35 U.S.C. 154(b) by 161 days.

(21) Appl. No.: 18/134,091

(22) Filed: Apr. 13, 2023

(65) Prior Publication Data

US 2024/0345832 A1    Oct. 17, 2024

(51) Int. Cl.
G06F 8/71 (2018.01)
G06F 8/41 (2018.01)

(52) U.S. Cl.
CPC .............. *G06F 8/71* (2013.01); *G06F 8/433* (2013.01)

(58) Field of Classification Search
USPC ....................................................... 717/121
See application file for complete search history.

(56) References Cited

U.S. PATENT DOCUMENTS

| 8,904,405 | B1 | 12/2014 | Peeters et al. |
| 11,086,757 | B1* | 8/2021 | Ciliberti ................ G06F 11/366 |
| 11,467,951 | B2 | 10/2022 | Pillai et al. |
| 2004/0255265 | A1 | 12/2004 | Brown et al. |
| 2008/0059946 | A1* | 3/2008 | Harding .................... G06F 8/71 717/106 |
| 2012/0167057 | A1 | 6/2012 | Schmich et al. |
| 2013/0152047 | A1 | 6/2013 | Moorthi et al. |

(Continued)

OTHER PUBLICATIONS

"[Mainframe] Application Development Tools"; IBM.com website [full URL found in ref.] as captured by the Wayback Machine Internet Archive (web.archive.org) on Aug. 27, 2022 (Year: 2022).*

*Primary Examiner* — Bradley A Teets
*Assistant Examiner* — Clint Thatcher
(74) *Attorney, Agent, or Firm* — Banner & Witcoff, Ltd.

(57) ABSTRACT

A computing platform may configure a dependency knowledge graph indicating file dependencies for mainframe applications, and an error knowledge graph indicating errors and corresponding solutions for the mainframe applications. The computing platform may receive mainframe source code. The computing platform may analyze, using the knowledge graphs, the mainframe source code to identify potential errors and corresponding solutions. Based on identifying an error in the mainframe source code, the computing platform may cause the mainframe source code to be updated according to the corresponding solution. The computing platform may analyze, using the dependency knowledge graph and the error knowledge graph, the updated mainframe source code to identify remaining errors. Based on identifying an absence of the remaining errors, the computing platform may send, to a mainframe build and deployment engine, the updated mainframe source code, which may cause the mainframe build and deployment engine to automatically execute a build process.

20 Claims, 10 Drawing Sheets

(56) References Cited

U.S. PATENT DOCUMENTS

| | | | |
|---|---|---|---|
| 2015/0052501 A1 | 2/2015 | Shani et al. | |
| 2016/0357529 A1 | 12/2016 | Tsujimori | |
| 2021/0357206 A1* | 11/2021 | Karve | G06F 11/3612 |
| 2023/0088197 A1 | 3/2023 | Cline | |
| 2023/0090828 A1 | 3/2023 | Patro et al. | |
| 2023/0091293 A1 | 3/2023 | Duplys | |
| 2023/0092030 A1 | 3/2023 | Battaglia et al. | |
| 2023/0093004 A1 | 3/2023 | Battaglia et al. | |
| 2023/0093370 A1 | 3/2023 | Battaglia et al. | |
| 2023/0094735 A1 | 3/2023 | Krasnov | |
| 2023/0096376 A1 | 3/2023 | Spertus et al. | |
| 2023/0103049 A1 | 3/2023 | Chitalia et al. | |
| 2023/0103989 A1 | 4/2023 | Wang et al. | |
| 2023/0104129 A1 | 4/2023 | Miriyala et al. | |
| 2023/0104751 A1 | 4/2023 | Laplante et al. | |
| 2023/0106381 A1 | 4/2023 | Chauhan et al. | |
| 2023/0385042 A1* | 11/2023 | Obando Chacon | G06F 8/447 |
| 2024/0004623 A1* | 1/2024 | Groenewegen | G06F 8/42 |
| 2024/0095114 A1* | 3/2024 | Najumudeen | G06F 11/0793 |
| 2024/0143288 A1* | 5/2024 | Kalra | G06F 8/33 |
| 2024/0152337 A1* | 5/2024 | Delany | G06F 8/34 |

* cited by examiner

NATURAL LANGUAGE PROCESSING (NLP) ENABLED CONTINUOUS INTEGRATION AND CONTINUOUS DELIVERY (CICD) DEPLOYMENT

BACKGROUND

In some instances, some application technologies may have tools to notify developers of build errors in early build stages of the corresponding source code. As a result, the detection of such errors might not result in excessive processing delays (e.g., as any errors may be quickly detected and addressed before the source code is rebuilt). In mainframe based application builds, however, such tools might not exist. Rather, a source code build must be completed to identify whether or not any errors are present. Given the size of such mainframe applications, the build time may be significant. Thus, awaiting the completion of such mainframe builds only to detect an error may result in significant inefficiencies (e.g., unnecessary consumption of processing resources, processing delays, and/or other inefficiencies). Accordingly, it may be important to improve error detection in mainframe application builds.

SUMMARY OF THE INVENTION

Aspects of the disclosure provide effective, efficient, scalable, and convenient technical solutions that address and overcome the technical problems associated with mainframe application builds. In accordance with one or more embodiments of the disclosure, a computing platform comprising at least one processor, a communication interface, and memory storing computer-readable instructions may configure a dependency knowledge graph indicating file dependencies for mainframe applications. The computing platform may configure an error knowledge graph indicating errors and corresponding solutions for the mainframe applications. The computing platform may receive mainframe source code. The computing platform may analyze, using the dependency knowledge graph and the error knowledge graph, the mainframe source code to identify potential errors and corresponding solutions. Based on identifying an error in the mainframe source code, the computing platform may cause the mainframe source code to be updated according to the corresponding solution. The computing platform may analyze, using the dependency knowledge graph and the error knowledge graph, the updated mainframe source code to identify remaining errors. Based on identifying an absence of the remaining errors, the computing platform may send, to a mainframe build and deployment engine, the updated mainframe source code and one or more commands directing the mainframe build and deployment engine to execute a build process on the updated mainframe source code, which may cause the mainframe build and deployment engine to automatically execute the build process.

In one or more instances, the computing platform may configure the dependency knowledge graph by communicating with a dependency data storage system to obtain the file dependencies for the mainframe applications. In one or more instances, configuring the dependency knowledge graph with the file dependencies for the mainframe applications may copy the file dependencies to local storage at the computing platform.

In one or more examples, configuring the error knowledge graph may be based on historical error and solution information from historical mainframe application builds. In one or more instances, analyzing the mainframe source code to identify potential errors and corresponding solutions may include verifying, using the dependency knowledge graph, the presence of all necessary file dependencies and identifying, using the error knowledge graph, the presence of any historically identified error.

In one or more instances, executing the mainframe build may result in an error. In one or more instances, the computing platform may receive error information of the error. The computing platform may tokenize the error information. The computing platform may update the dependency knowledge graph or the error knowledge graph based on the tokenized error information.

In one or more examples, causing the mainframe source code to be updated may include sending, to an enterprise computing device, an error notification indicating the corresponding solution. In one or more examples, causing the mainframe source code to be updated may include automatically updating the mainframe source code based on the corresponding solution. In one or more examples, causing the mainframe source code to be automatically updated may be based on identifying that a confidence score of the corresponding solution exceeds a predetermined confidence threshold.

BRIEF DESCRIPTION OF DRAWINGS

The present disclosure is illustrated by way of example and not limited in the accompanying figures in which like reference numerals indicate similar elements and in which.

DETAILED DESCRIPTION

Figure 1A:
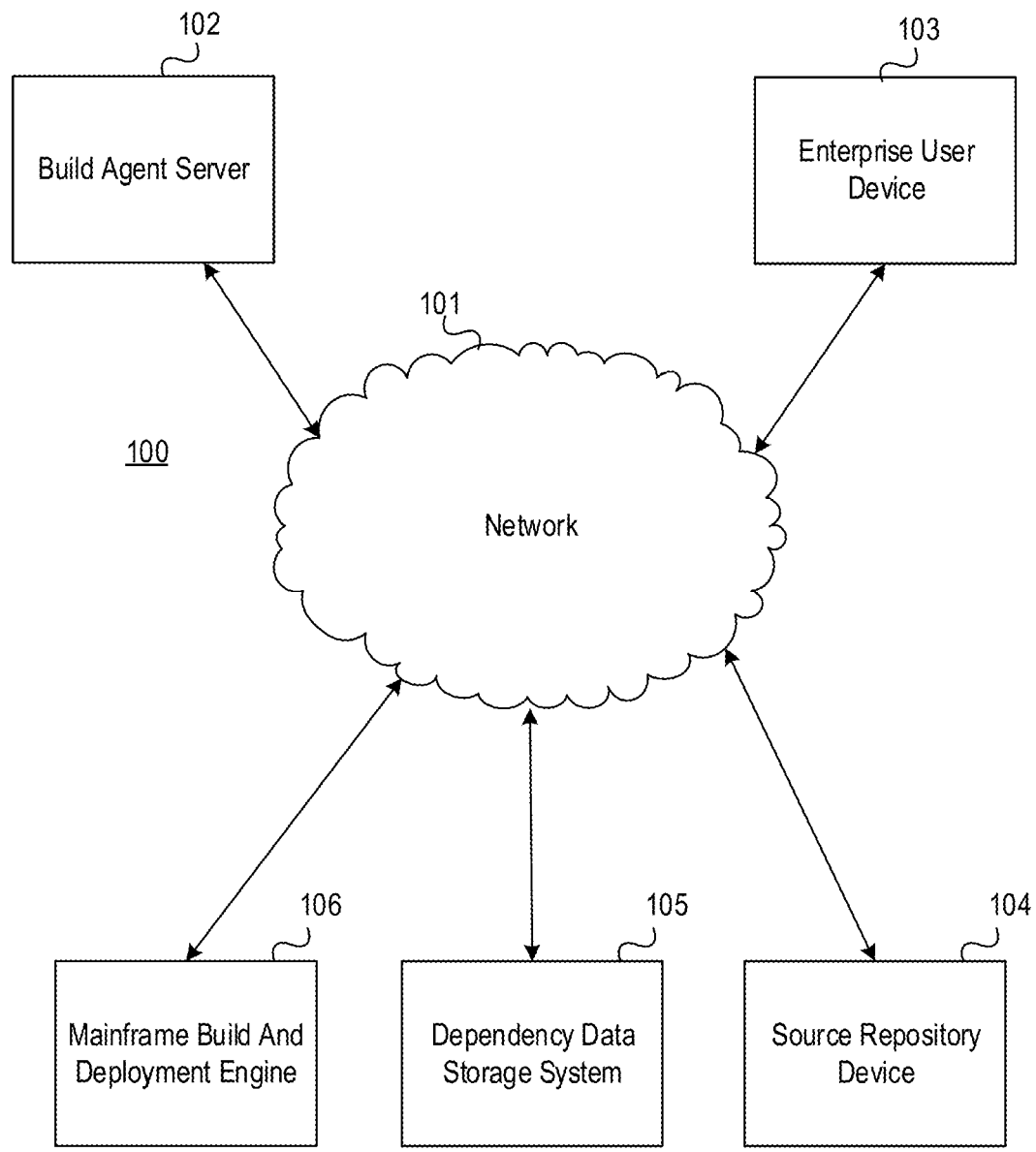
FIGS. 1A-1B depict an illustrative computing environment for automated pre-emptive error detection in mainframe application builds in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to pre-emptive build error detection and remediation for mainframe applications. Built in continuous integration and continuous delivery (CICD) is an important milestone in the process of taking a code base to production. This may be complex for applications developed on legacy technologies, such as Mainframe, Cobol, or the like.

Mainframe based application builds might not be as simple as Java, .NET, and/or other applications, which may have tools that notify of errors in the early build stage. Mainframe does not, however, have such tools. In mainframe application builds, build time may increase proportionally to a number of artifacts in a project, which may result in significant delays. Additionally, there may be inefficiencies in identifying object dependency prior to builds. Furthermore, running jobs manually and notifying of build status might not be practically possible.

Accordingly, described herein is a build agent, empowered with a code generation and compilation processor (CGCP) to identify build errors and dependencies at early states with the help of knowledge graphs using the learning from most recent successful builds. The build agent server may collect possible information on every build from a Mainframe Environment for every object, and may prepare a knowledge graph using support vector machine classification and bi-directional long-short term memory (BI-LSTM) deep learning algorithms to identify errors, object dependencies, and source code patterns, and simulate the build on non-mainframe servers. The build agent may be introduced in a continuous integration chain. Whenever any module or object is changed in source repository, it may trigger a build on a non-mainframe environment to identify risks or errors prior to executing the build for mainframe source code components.

The CGCP enabled with the build agent may mock a mainframe like environment on a windows server and may provide suggestions on build anomalies via a knowledge graph. The introduction of the build agent in the CICD pipeline may provide the capability to predict build anomalies using a knowledge graph power with support vector machine classification and LSTM algorithms to recognize patterns and objects.

As an example event sequence, users may download source code onto their desktop from a source repository. The user may commit changes to the source repository. An orchestrator may trigger a build, which may cause the entire source code to be built on the mainframe server. Any errors identified during the build would require further builds for the same code base post rectification.

More specifically, the users may commit the code to a source repository, and the build orchestrator may trigger the build. An artificial intelligence (AI) agent on a build agent server may interpret the build request and initiate a request to identify any error on a changed/requested object based on a knowledge graph. This may identify errors and notify developers with possible suggestions before the actual build happens. If there are no errors, the build agent may send the most recent successful build details obtained from the knowledge graph to the code generation and compilation processor. The code generation and compilation processor may identify the dependencies of changed source files, and then compile the code to check the errors in the code on non-mainframe servers. If there are any build errors, those would be fed into the knowledge graph. The mainframe submit processor (MSP) may upload the artifacts to a mainframe system identified by CGCP. A job may be triggered at the mainframe to compile only the source files mentioned in artifacts. The MSP may update dependency information of compiled files for triggering subsequent builds. The MSP may send status information to developers by communicating with an automation process.

Figure 1B:
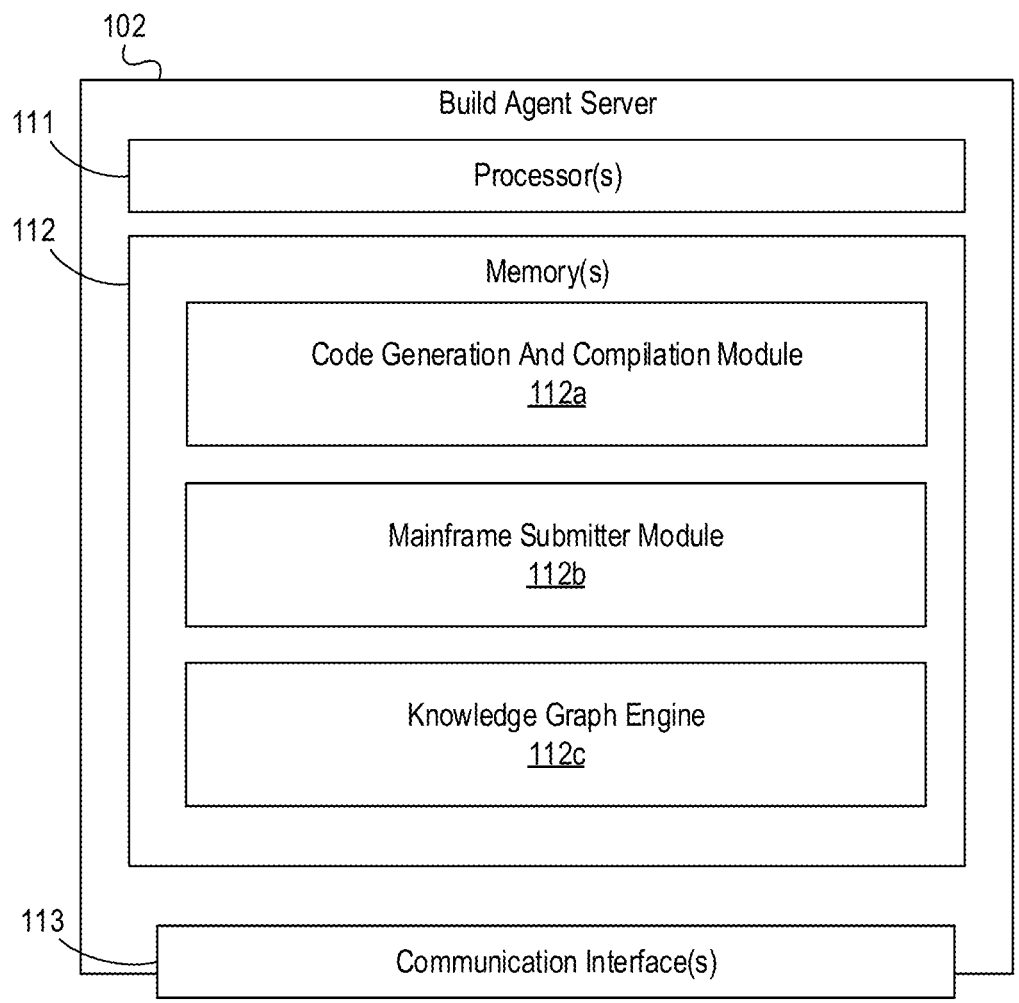

FIGS. 1A-1B depict an illustrative computing environment for automated pre-emptive error detection in mainframe application builds in accordance with one or more example embodiments. Referring to FIG. 1A, computing environment 100 may include one or more computer systems. For example, computing environment 100 may include a build agent server 102, enterprise user device 103, source repository device 104, dependency data storage system 105, and mainframe build and deployment engine 106.

Build agent server 102 may include one or more computing devices and/or other computer components (e.g., processors, memories, communication interfaces, or the like). For example, the build agent server 102 may generate, host, and/or otherwise maintain knowledge graphs that may be used to identify potential errors in mainframe source code, as well as potential corresponding solutions. In some instances, the build agent server 102 may be configured with natural language processing (NLP) capabilities, which may enable the build agent server 102 to process natural language included in the source code, and analyze the natural language/source code accordingly using the knowledge graphs. In some instances, the build agent server 102 may intercept mainframe source code and build execution requests prior to routing the code/requests to a mainframe build and deployment engine (e.g., mainframe build and deployment engine 106).

Enterprise user device 103 may be or include one or more devices (e.g., laptop computers, desktop computer, smartphones, tablets, and/or other devices) configured for use in the preparation and/or modification of mainframe source code. For example, the user device 103 may be configured to receive predicted error information, proposed modification/solution information, error notifications, and/or other information. In some instances, the user device 103 may be configured to display graphical user interfaces (e.g., displaying code and/or any received information). Any number of such user devices may be used to implement the techniques described herein without departing from the scope of the disclosure. For example, a plurality of user devices may be used to modify and/or otherwise update the mainframe source code.

Source repository device 104 may be or include one or more devices (e.g., servers, server blades, or the like), which may, e.g., be configured to store source code (e.g., which has not yet been built, compiled, run, or the like). For example, the source repository device 104 may communicate with the enterprise user device 103 and/or other devices to initially obtain the mainframe source code.

Dependency data storage system 105 may be or include one or more devices (e.g., servers, server blades, or the like) configured to store file dependency information for mainframe source code. For example, the dependency data storage system 105 may store relationships between targets and sources, linked files, and/or other relationships within mainframe source code (e.g., where the absence of a depended on file may result in a build error). The dependency data storage system 105 may be configured to communicate with the build agent server 102 to provide dependency information that may be used to generate the dependency knowledge graph.

The mainframe build and deployment engine 106 may be or include one or more devices (e.g., servers, server blades, or the like) configured to execute builds of mainframe source code. For example, once the mainframe source code has been analyzed by the build agent server 102, it may be passed to the mainframe build and deployment engine 106 for execution of the build process. The mainframe build and deployment engine 106 may be configured to send information of the build (e.g., build confirmation, error notifications, or the like) to the build agent server 102 and/or the enterprise user device 103.

Computing environment 100 also may include one or more networks, which may interconnect build agent server 102, enterprise user device 103, source repository device 104, dependency data storage system 105, and mainframe build and deployment engine 106. For example, computing environment 100 may include a network 101 (which may interconnect, e.g., build agent server 102, enterprise user device 103, source repository device 104, dependency data storage system 105, and mainframe build and deployment engine 106).

In one or more arrangements, build agent server 102, enterprise user device 103, source repository device 104, dependency data storage system 105, and mainframe build and deployment engine 106 may be any type of computing device capable of receiving a user interface, receiving input via the user interface, and communicating the received input to one or more other computing devices. For example, build agent server 102, enterprise user device 103, source repository device 104, dependency data storage system 105, mainframe build and deployment engine 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of build agent server 102, enterprise user device 103, source repository device 104, dependency data storage system 105, and mainframe build and deployment engine 106 may, in some instances, be special-purpose computing devices configured to perform specific functions.

Referring to FIG. 1B, build agent server 102 may include one or more processors 111, memory 112, and communication interface 113. A data bus may interconnect processor 111, memory 112, and communication interface 113. Communication interface 113 may be a network interface configured to support communication between build agent server 102 and one or more networks (e.g., network 101, or the like). Memory 112 may include one or more program modules having instructions that when executed by processor 111 cause build agent server 102 to perform one or more functions described herein and/or one or more databases that may store and/or otherwise maintain information which may be used by such program modules and/or processor 111. In some instances, the one or more program modules and/or databases may be stored by and/or maintained in different memory units of build agent server 102 and/or by different computing devices that may form and/or otherwise make up build agent server 102. For example, memory 112 may have, host, store, and/or include code generation and compilation module 112*a*, mainframe submitter module 112*b*, and a knowledge graph engine 112*c*. Code generation and compilation module 112*a* may have instructions that direct and/or cause build agent server 102 to route incoming mainframe source code for analysis using the knowledge graph engine 112*c*. Mainframe submitter module 112*b* may be configured to transmit mainframe source code (once validated against the knowledge graph engine 112*c*) to the mainframe build and deployment engine 106 for execution of a build process. Knowledge graph engine 112*c* may be configured to establish, host, and/or otherwise maintain a plurality of knowledge graphs, which may, e.g., be used to pre-emptively identify build errors in mainframe source code. In some instances, the knowledge graph engine 112*c* may incorporate one or more dynamic feedback loops, which may, e.g., enable continuous improvement of the build agent server 102 and improve pre-emptive error detection in mainframe source code.

Figure 2A:
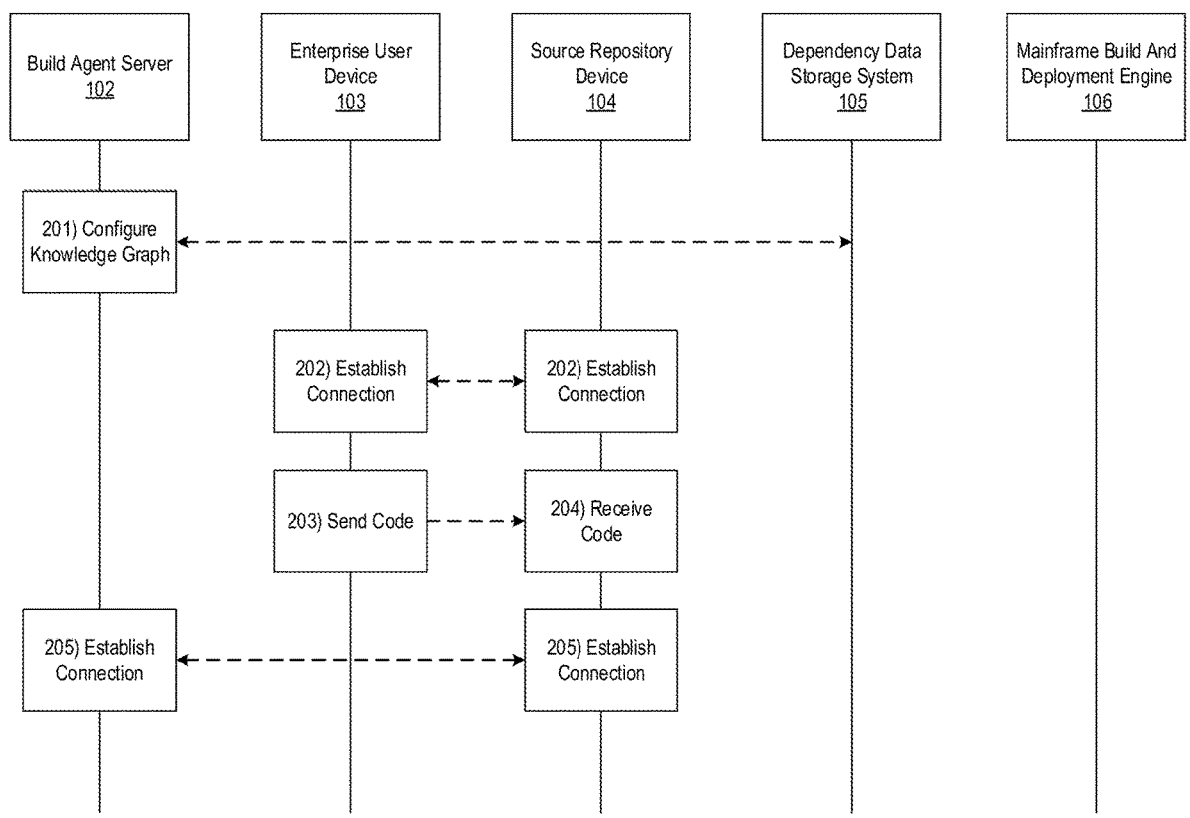
FIGS. 2A-2D depict an illustrative event sequence for automated pre-emptive error detection in mainframe application builds in accordance with one or more example embodiments.

FIGS. 2A-2D depict an illustrative event sequence for automated pre-emptive error detection in mainframe application builds in accordance with one or more example embodiments. Referring to FIG. 2A, at step 201, the build agent server 102 may configure a plurality of knowledge graphs. For example, the build agent server 102 may generate a dependency knowledge graph and an error knowledge graph.

Figure 6:
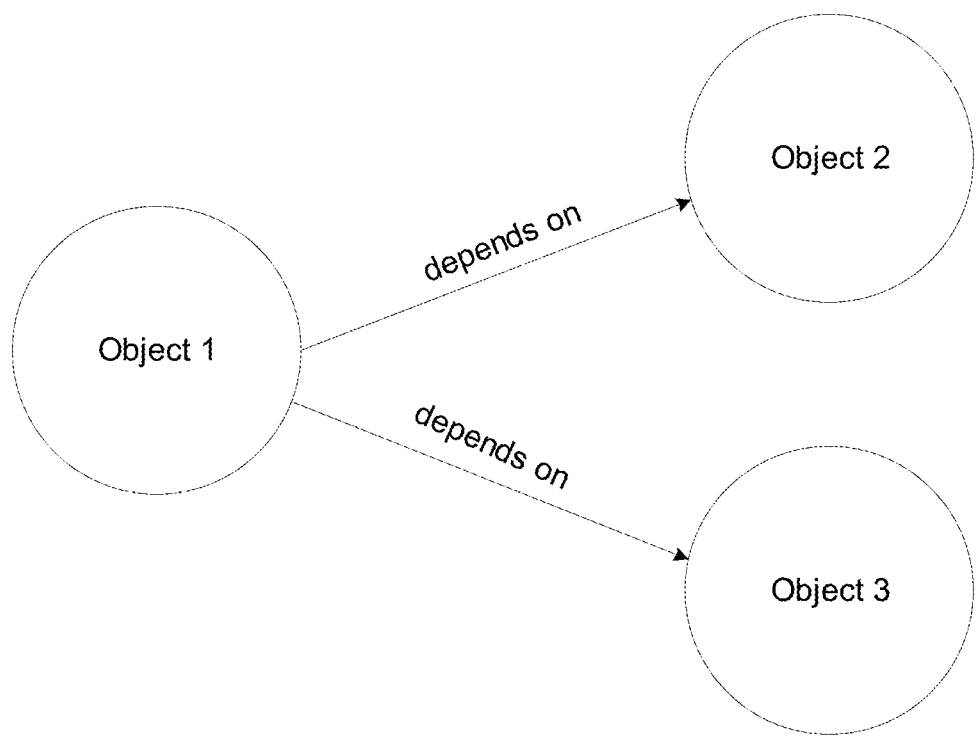
FIGS. 6 and 7 depict illustrative knowledge graphs for automated pre-emptive error detection in mainframe application builds in accordance with one or more example embodiments.

In generating the dependency knowledge graph, the build agent server 102 may communicate with the dependency data storage system 105. For example, the build agent server 102 may communicate with the dependency data storage system 105 to obtain target/source information, object dependency information, and/or other relationships between mainframe code commands and corresponding dependent objects. After obtaining the dependency information, the build agent server 102 may generate a knowledge graph to represent the dependencies. For example, the build agent server 102 may generate a knowledge graph similar to knowledge graph 600, which is illustrated in FIG. 6. As shown in FIG. 6, execution of, for example, Object 1 depends on the presence of both Object 2 and Object 3. Accordingly, failure to access such objects may result in an error in the build or execution of Object 1 (which may, e.g., cause an error in the mainframe application build). Thus, the presence of such relied upon objects may be ensured in advance to avoid mainframe build errors and avoid processing delays.

Figure 7:
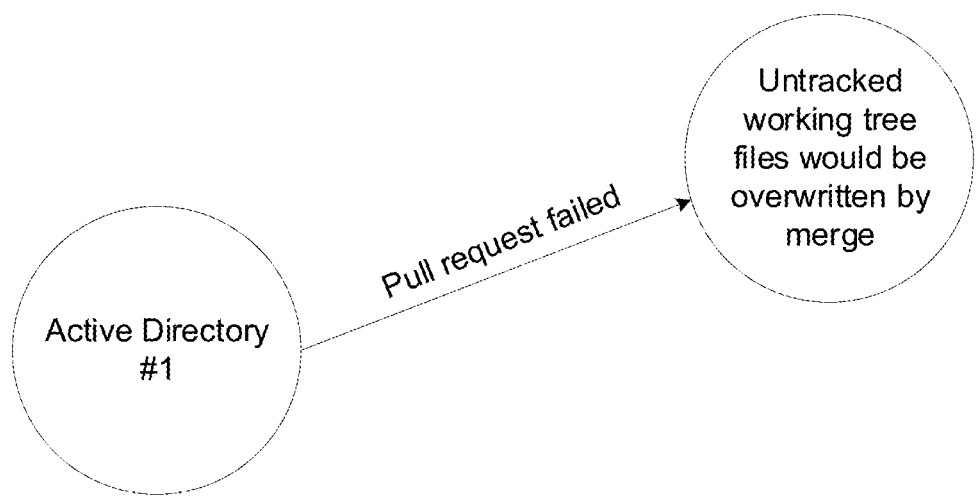

In generating the error knowledge graph, the build agent server 102 may obtain historical errors and corresponding solutions (e.g., from an error and/or action log, one or more users, or the like). For example, the build agent server 102 may obtain information about files/objects, historical errors for those files/objects, and corresponding solutions for the errors, and may generate a knowledge graph to represent these correlations. For example, the build agent server 102 may generate a knowledge graph similar to knowledge graph 700, which is illustrated in FIG. 7. As shown in FIG. 7, requesting information from the active directory may result in an error, and the proposed solution may be to use a merge function to overwrite untracked working tree files. Accordingly, if "Active Directory #1" is included in, requested by, and/or otherwise associated with mainframe source code, the overwrite (or another solution) may be automatically executed in advance of the build to avoid processing delays. The knowledge graphs illustrated in FIGS. 6 and 7 may include any number of nodes and connections without departing from the scope of the disclosure. In some instances, in generating the knowledge graphs, the build agent server 102 may copy the information for the knowledge graphs into local storage, which may, e.g., improve a speed at which the build agent server 102 may be able to access the information.

In some instances, the build agent server 102 may re-generate and/or otherwise update the knowledge graphs based on a most recent (successful) mainframe application build. Additionally or alternatively, the build agent server 102 may collect information (e.g., errors, dependencies, solutions, and/or other information) on every build from a mainframe environment corresponding to the build agent server 102 for every potential object. In these instances, the build agent server 102 may use support vector machine (SVM) classification, bi-directional long term short memory (BI-LSTM) deep learning, natural language processing, and/ or other techniques to identify errors, object dependencies, source code patterns, and/or other information and to simulate builds in advance (e.g., on the build agent server 102 itself and/or other servers).

At step 202, the enterprise user device 103 may establish a wireless connection with the source repository device 104. For example, the enterprise user device 103 may establish a first wireless data connection with the source repository device 104 (e.g., in preparation for sending source code to the source repository device 104). In some instances, the enterprise user device 103 may identify whether or not a connection is already established with the source repository device 104. If a connection is already established with the source repository device 104, the enterprise user device 103 might not re-establish the connection. If a connection is not yet established with the source repository device 104, the enterprise user device 103 may establish the first wireless data connection as described herein.

At step 203, the enterprise user device 103 may send mainframe source code to the source repository device 104 for storage. For example, the enterprise user device 103 may send the mainframe source code to the source repository device 104 while the first wireless data connection is established. In sending the mainframe source code, the enterprise user device 103 may send code that has not yet been built or otherwise compiled.

At step 204, the source repository device 104 may receive the mainframe source code sent at step 203. For example, the source repository device 104 may receive the mainframe source code while the first wireless data connection is established. In some instances, the source repository device 104 may store the mainframe source code.

At step 205, the source repository device 104 may establish a connection with the build agent server 102. For example, the source repository device 104 may establish a second wireless data connection with the build agent server 102. For example, the source repository device 104 may establish a second wireless data connection with the build agent server 102 to link the source repository device 104 to the build agent server 102 (e.g., in preparation for sending source code). In some instances, the source repository device 104 may identify whether or not a connection is already established with the build agent server 102. If a connection is already established with the build agent server 102, the source repository device 104 might not re-establish the connection. Otherwise, if a connection is not yet established with the build agent server 102, the source repository device 104 may establish the second wireless data connection as described herein.

Figure 2B:
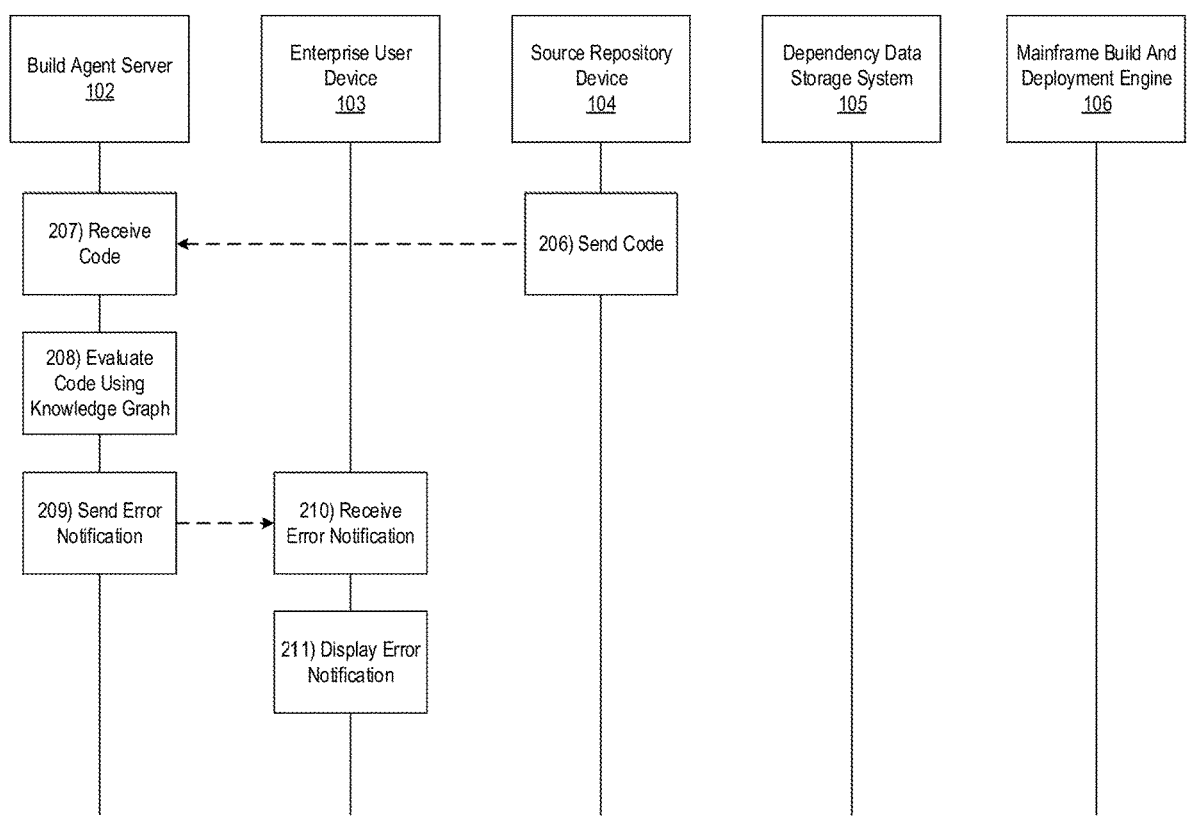

Referring to FIG. 2B, at step 206, the source repository device 104 may send mainframe source code (e.g., mainframe source code stored at the source repository device 104 such as the mainframe source code received at step 204) to the build agent server 102. For example, the source repository device 104 may send the mainframe source code to the build agent server 102 while the second wireless data connection is established. In some instances, the source repository device 104 may send the mainframe source code each time any module or object is changed in the source repository device 104.

At step 207, the build agent server 102 may receive the mainframe source code sent at step 206. For example, the build agent server 102 may receive the mainframe source code via the communication interface 113 and while the second wireless data connection is established. For example, in receiving the mainframe source code, the build agent server 102 may intercept the mainframe source code before such mainframe source code is routed to the mainframe build and deployment engine 106 (e.g., to be built and deployed).

At step 208, the build agent server 102 may evaluate the mainframe source code (e.g., received at step 207) using the knowledge graphs generated at step 201. For example, in some instances, the build agent server 102 may have received the mainframe source code at the code generation and compilation module 112a, and may pass the mainframe source code to the knowledge graph engine 112c for analysis. In these instances, the build agent server 102 may use the dependency knowledge graph to verify that all objects on which the mainframe source code relies (including any sub-objects on which these objects rely) are present and/or otherwise accessible (e.g., based on comparing the mainframe source code and available objects to the dependency knowledge graph). If any objects on which the mainframe source code depends or otherwise relies are missing, the build agent server 102 may flag the missing objects, and proceed to step 209.

Additionally or alternatively, the build agent server 102 may evaluate the mainframe source code using the error knowledge graph. For example, the build agent server 102 may compare components and/or portions of the mainframe source code to the knowledge graph to identify previously encountered errors and corresponding solutions for such errors.

In some instances, the build agent server 102 may evaluate the mainframe source code against the knowledge graphs using SVM classification, BI-LSTM deep learning, natural language processing, and/or other methods to perform pattern and/or object recognition.

If any errors are predicted by for the mainframe source code, the build agent server 102 may flag any such predicted errors and any corresponding solutions, and proceed to step 209. If no errors are identified/predicted by the build agent server 102 (e.g., using either knowledge graph), the build agent server 102 may proceed to step 213. In some instances, prior to proceeding to step 213, if no errors are identified/ predicted, the build agent server 102 may execute a simulated build of the mainframe source code to verify a successful build prior to passing the mainframe source code to the mainframe build and deployment engine 106. In these instances, the build agent server 102 may send the mainframe source code to the mainframe build and deployment engine 106 after verifying that the simulated build was successfully completed.

At step 209, the build agent server 102 may send an error notification to the enterprise user device 103. For example, the build agent server 102 may send an error notification identifying any missing dependent files and/or other predicted errors. In some instances, the build agent server 102 may also send proposed solution information (e.g., as identified based on the knowledge graphs). In some instances, the build agent server 102 may also send one or more commands to the enterprise user device 103 directing the enterprise user device 103 to display the error notification. In some instances, the build agent server 102 may send the error notification to the enterprise user device 103 via the communication interface 113 and while a wired or wireless data connection is established between the build agent server 102 and the enterprise user device 103.

At step 210, the enterprise user device 103 may receive the error notification sent at step 209. For example, the enterprise user device 103 may receive the error notification while a wired or wireless data connection is established between the enterprise user device 103 and the build agent server 102. In some instances, the enterprise user device 103 may also receive one or more commands directing the enterprise user device 103 to display the error notification.

Figure 4:
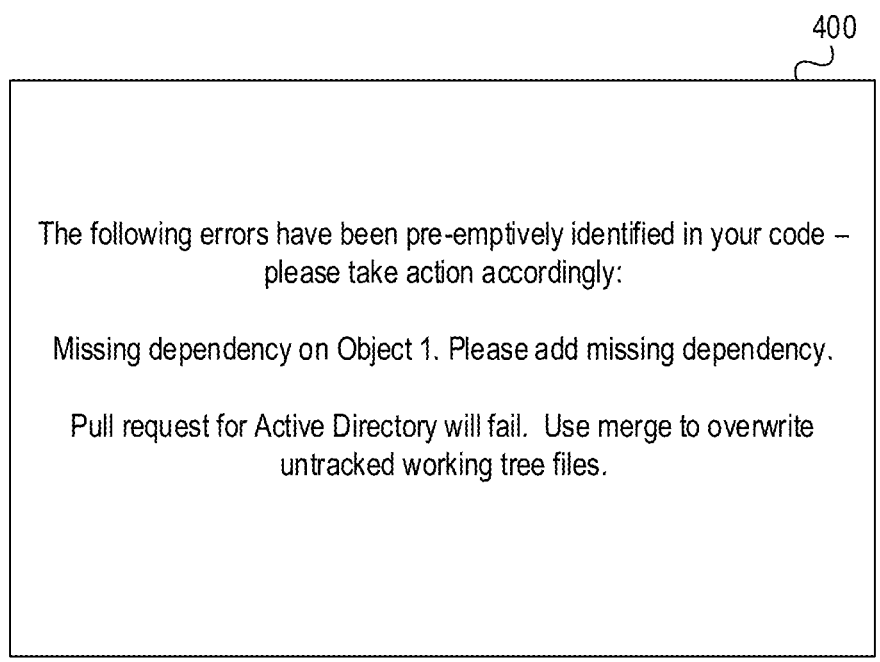

At step 211, based on or in response to the one or more commands directing the enterprise user device 103 to display the error notification, the enterprise user device 103 may display the error notification. For example, the enterprise user device 103 may display a graphical user interface similar to graphical user interface 400, which is shown in FIG. 4, and which indicates predicted errors in the mainframe source code along with corresponding solutions.

Figure 2C:
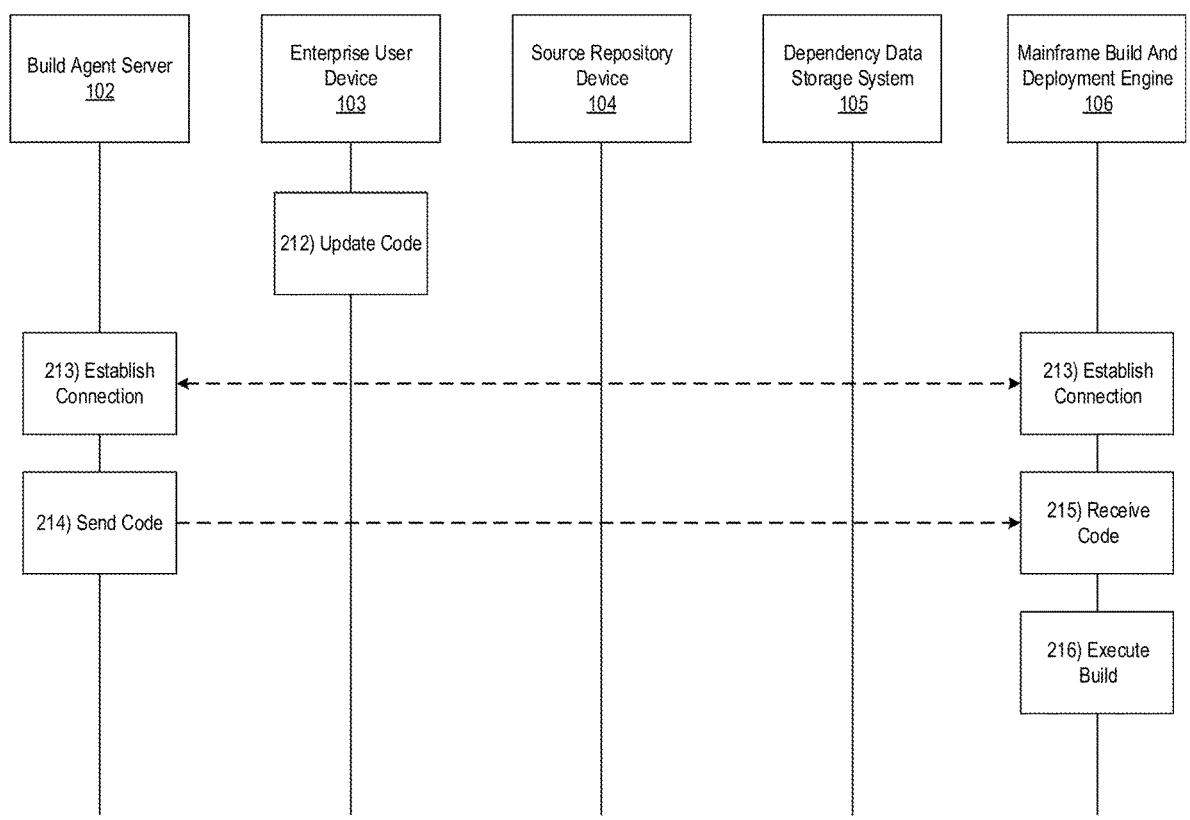

Referring to FIG. 2C, at step 212 the enterprise user device 103 may update the mainframe source code. For example, the enterprise user device 103 may receive user input to address any errors identified in the error notification (e.g., updates to the code, directories, available objects/files, or the like by a developer using the enterprise user device 103). Additionally or alternatively, the build agent server 102 may have sent one or more commands directing the enterprise user device 103 to automatically update the mainframe source code, directories, available objects/files, and/or other information to address the errors, which may, e.g., cause the enterprise user device 103 and/or other devices to automatically update the mainframe source code. In some of these instances, the enterprise user device 103 may update the mainframe source automatically without additional user input. In other instances, the enterprise user device 103 may prompt for user approval to automatically execute the update. In these instances, the enterprise user device 103 may automatically execute the update if approval is received, and might not execute the update if approval is not received.

In some instances, the decision of whether to automatically cause an update without requesting approval, automatically cause an update after receiving approval, and/or provide a recommended solution for display/manual update may be made by the build agent server 102 based on a confidence score corresponding to the identified solution. For example, the build agent server 102 may generate such a confidence score, and may compare the confidence score to one or more thresholds. For example, if the build agent server 102 identifies that the confidence score is below a first threshold, it may send the error notification and provide a solution to be manually implemented. If the build agent server 102 identifies that the confidence score meets or is above the first threshold but below a second threshold, higher than the first threshold, the build agent server 102 may provide automated update commands, but may prompt for user permission to perform the update. If the build agent server 102 identifies that the confidence score meets or is above the second threshold, the build agent server 102 may automatically cause the update to be performed without requesting permission/approval. In some instances, the build agent server 102 may identify the confidence score based on a historical success rate of the proposed solution correcting the identified error (e.g., based on the historical dependency and error/solution information).

Once the mainframe source code has been updated according to one or more of the methods described above, the enterprise user device 103 may send the updated mainframe source code back to the build agent server 102, which may return to step 207 to receive the mainframe source code for further analysis.

At step 213, the build agent server 102 may establish a connection with the mainframe build and deployment engine 106. For example, the build agent server 102 may establish a third wireless data connection with the mainframe build and deployment engine 106 to link the build agent server 102 to the mainframe build and deployment engine 106 (e.g., in preparation for sending mainframe source code and corresponding build requests). In some instances, the build agent server 102 may identify whether or not a connection is already established with the mainframe build and deployment engine 106. If a connection is already established with the mainframe build and deployment engine 106, the build agent server 102 might not re-establish the connection. If a connection is not yet established with the mainframe build and deployment engine 106, the build agent server 102 may establish the third wireless data connection as described herein.

At step 214, the build agent server 102 may send the mainframe source code to the mainframe build and deployment engine 106. In some instances, the build agent server 102 may send the mainframe source code to the mainframe build and deployment engine 106 via the communication interface 113 and while the third wireless data connection is established. In some instances, the build agent server 102 may also send one or more commands directing the mainframe build and deployment engine 106 to execute a build and/or otherwise compile the mainframe source code. In some instances, the build agent server 102 may send the mainframe source code to the mainframe build and deployment engine 106 using the mainframe submitter module 112b.

At step 215, the mainframe build and deployment engine 106 may receive the mainframe source code sent at step 214. For example, the mainframe build and deployment engine 106 may receive the mainframe source code while the third wireless data connection is established. In some instances, the mainframe build and deployment engine 106 may also receive the one or more commands directing the mainframe build and deployment engine 106 to execute the build and/or otherwise compile the mainframe source code.

At step 216, based on or in response to the one or more commands directing the mainframe build and deployment engine 106 to execute the build, the mainframe build and deployment engine 106 may build the mainframe source code (which may, e.g., configure a corresponding mainframe application for deployment).

Figure 2D:
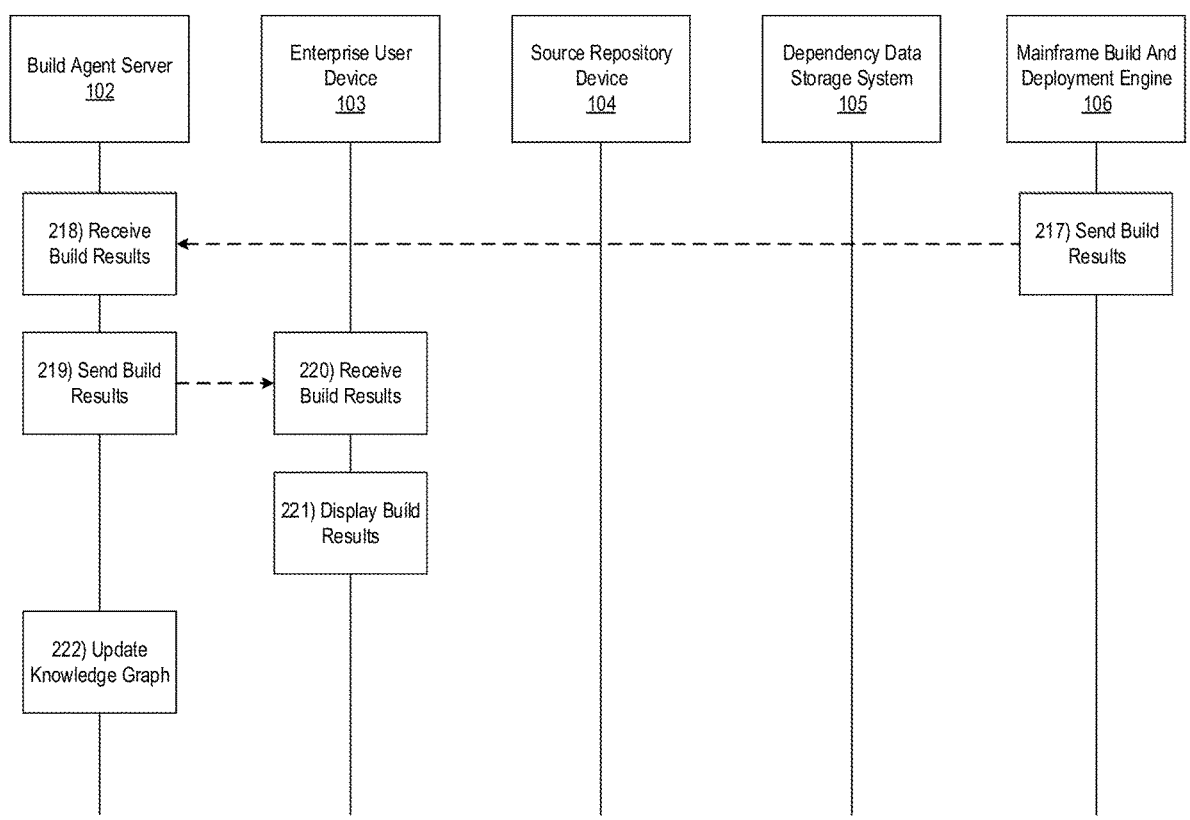

Referring to FIG. 2D, at step 217, the mainframe build and deployment engine 106 may send results of the build (e.g., success, error, or the like) to the build agent server 102. For example, the mainframe build and deployment engine 106 may send the results of the build to the build agent server 102 while the third wireless data connection is established. In doing so, the mainframe build and deployment engine 106 may perform continuous integration and continuous deployment of the mainframe application.

At step 218, the build agent server 102 may receive the build results sent at step 217. For example, the build agent server 102 may receive the build results via the communication interface 113 and while the third wireless data connection is established.

At step 219, the build agent server 102 may send the build results to the enterprise user device 103. For example, the build agent server 102 may send the build results to the enterprise user device 103 via the communication interface 113 and while a wired or wireless connection is established. In some instances, the build agent server 102 may also send one or more commands directing the enterprise user device 103 to display the build results.

At step 220, the enterprise user device 103 may receive the build results sent at step 219. For example, the enterprise user device 103 may receive the build results while a wired or wireless connection is established with the build agent server.

Figure 3:
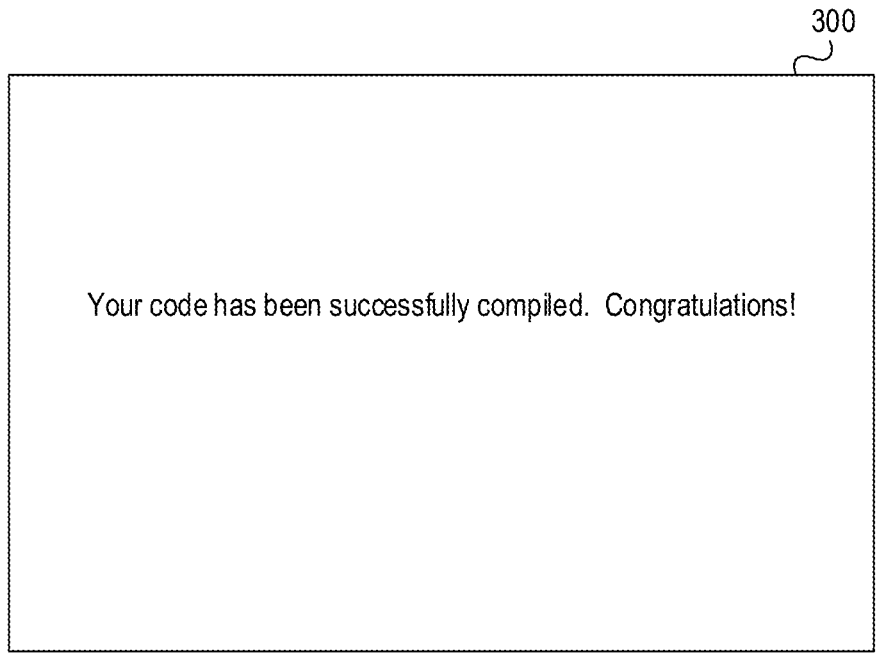
FIGS. 3 and 4 depict illustrative user interfaces for automated pre-emptive error detection in mainframe application builds in accordance with one or more example embodiments.

At step 221, based on or in response to the one or more commands directing the enterprise user device 103 to display the build results, the enterprise user device 103 may display the build results. For example, the enterprise user device 103 may display a graphical user interface similar to graphical user interface 300, which is illustrated in FIG. 3, and which indicates that the build of the mainframe application was successful (e.g., no build errors). In these instances, the mainframe application may be released for deployment.

Alternatively, the enterprise user device 103 may display a graphical user interface indicating that at least one error was identified during the build. In these instances, the error may have been undetected in the knowledge graph analysis, and thus might be an error that has not previously been identified by the build agent server 102 (hence the failure to detect the error in the knowledge graph analysis). In such instances, troubleshooting may be used to identify a solution that may place the mainframe source code in condition for a successful build.

At step 222, the build agent server 102 may update the knowledge graphs based on the knowledge graph analysis performed at step 208 and the build results sent at step 217. For example, in instances where a build was successful, the build agent server 102 may re-enforce the knowledge graph based on any dependencies and/or errors identified in the mainframe source code using the knowledge graphs, along with the corresponding solutions. In instances where the build was not successful, the build agent server 102 may update the knowledge graphs to include any newly identified errors and corresponding solutions used to remediate such errors. For example, the build agent server 102 may tokenize any error information (e.g., separating objects from errors from solutions, or the like), which may, e.g., have been included within the build results. In these instances, the build agent server 102 may update the knowledge graphs based on the tokenized error information.

In doing so, the build agent server 102 may continue to refine the knowledge graphs using a dynamic feedback loop, which may, e.g., increase the accuracy and effectiveness of the pre-emptive mainframe source code error detection capabilities of the build agent server 102 based on the knowledge graphs.

Figure 5:
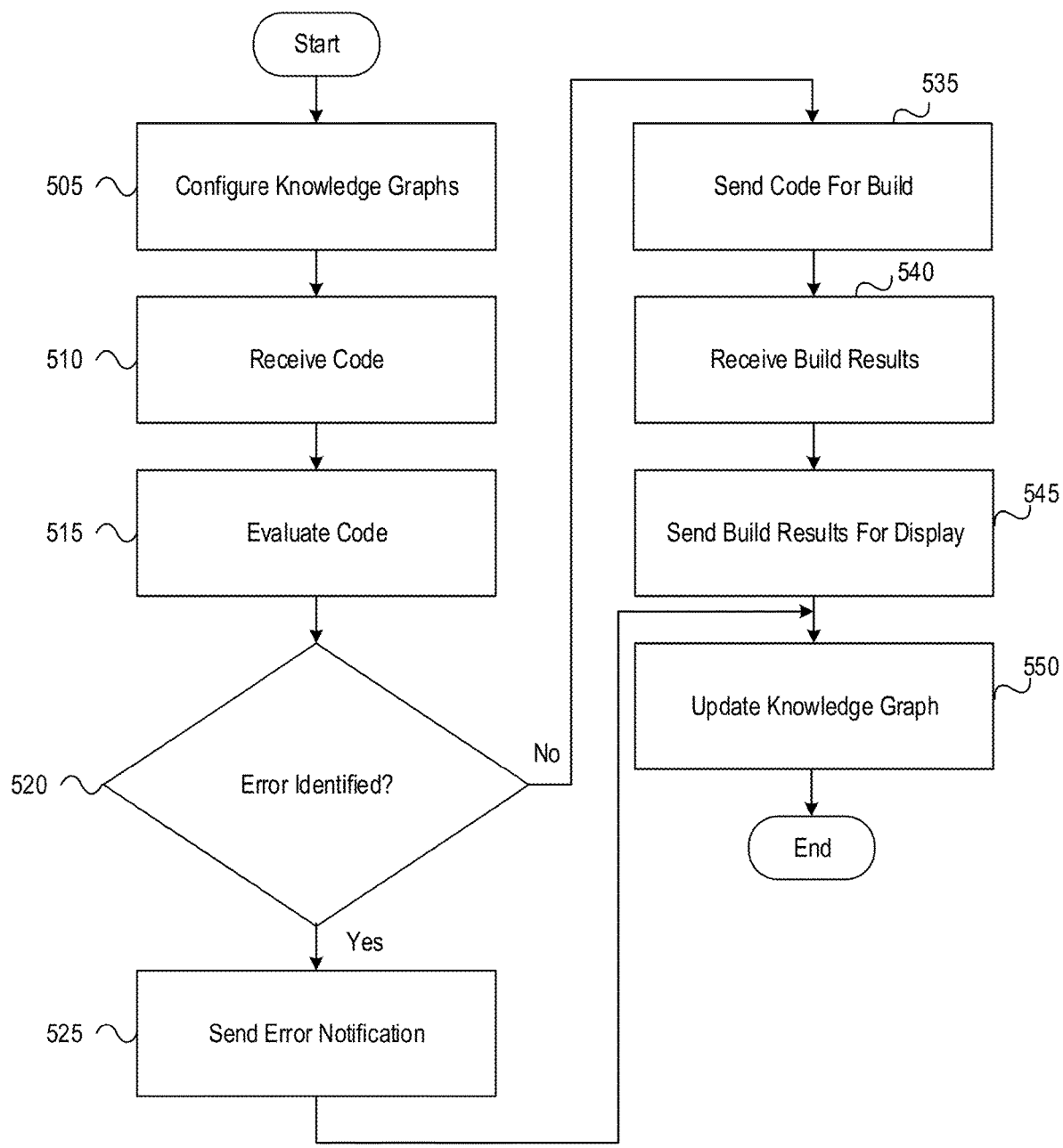
FIG. 5 depicts an illustrative method for automated pre-emptive error detection in mainframe application builds in accordance with one or more example embodiments.

FIG. 5 depicts an illustrative method for automated pre-emptive error detection in mainframe application builds in accordance with one or more example embodiments. Referring to FIG. 5, at step 505, a computing platform comprising a memory, one or more processors, and a communication interface may configure an error knowledge graph and a dependency knowledge graph for mainframe source code error identification. At step 510, the computing platform may receive the mainframe source code. At step 515, the computing platform may evaluate the mainframe source code using the error knowledge graph and the dependency knowledge graph. At step 520, the computing platform may identify whether or not the knowledge graph analysis yielded any predicted errors. If no errors are predicted, the computing platform may proceed to step 535.

At step 535, the computing platform may send the mainframe source code to a mainframe build and deployment engine to be built. At step 540, the computing platform may receive build results from the mainframe build and deployment engine. At step 545, the computing platform may send the build results to a user device for display. At step 550, the computing platform may update the knowledge graphs based on the error analysis and the build results.

Returning to step 540, if an error was identified, the computing platform may proceed to step 525. At step 525, the computing platform may send an error notification to the user device for display. The computing platform may then proceed to update the knowledge graphs at step 550 as described above.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
configure a dependency knowledge graph indicating file dependencies for mainframe applications;
configure an error knowledge graph indicating errors and corresponding solutions for the mainframe applications;
receive mainframe source code;
analyze, using the dependency knowledge graph and the error knowledge graph, the mainframe source code to identify potential errors and corresponding solutions;
based on identifying an error in the mainframe source code, cause the mainframe source code to be updated according to the corresponding solution;
analyze, using the dependency knowledge graph and the error knowledge graph, the updated mainframe source code to identify remaining errors; and
based on identifying an absence of the remaining errors, send, to a mainframe build and deployment engine, the updated mainframe source code and one or more commands directing the mainframe build and deployment engine to execute a build process on the updated mainframe source code, wherein sending the one or more commands directing the mainframe build and deployment engine causes the mainframe build and deployment engine to automatically execute the build process.

2. The computing platform of claim 1, wherein configuring the dependency knowledge graph comprises communicating with a dependency data storage system to obtain the file dependencies for the mainframe applications.

3. The computing platform of claim 2, wherein configuring the dependency knowledge graph with the file dependencies for the mainframe applications copies the file dependencies to local storage at the computing platform.

4. The computing platform of claim 1, wherein configuring the error knowledge graph is based on historical error and solution information from historical mainframe application builds.

5. The computing platform of claim 1, wherein analyzing the mainframe source code to identify potential errors and corresponding solutions comprises:

verifying, using the dependency knowledge graph, the presence of all necessary file dependencies and
identifying, using the error knowledge graph, the presence of any historically identified error.

6. The computing platform of claim 1, wherein executing the mainframe build results in an error.

7. The computing platform of claim 6, wherein the memory stores additional computer readable instructions that, when executed by the at least one processor, cause the computing platform to:
receive error information of the error;
tokenize the error information; and
update the dependency knowledge graph or the error knowledge graph based on the tokenized error information.

8. The computing platform of claim 1, wherein causing the mainframe source code to be updated comprises sending, to an enterprise computing device, an error notification indicating the corresponding solution.

9. The computing platform of claim 1, wherein causing the mainframe source code to be updated comprises automatically updating the mainframe source code based on the corresponding solution.

10. The computing platform of claim 9, wherein causing the mainframe source code to be automatically updated is based on identifying that a confidence score of the corresponding solution exceeds a predetermined confidence threshold.

11. A method comprising:
at a computing platform comprising at least one processor, a communication interface, and memory:
configuring a dependency knowledge graph indicating file dependencies for mainframe applications;
configuring an error knowledge graph indicating errors and corresponding solutions for the mainframe applications;
receiving mainframe source code;
analyzing, using the dependency knowledge graph and the error knowledge graph, the mainframe source code to identify potential errors and corresponding solutions;
based on identifying an error in the mainframe source code, causing the mainframe source code to be updated according to the corresponding solution;
analyzing, using the dependency knowledge graph and the error knowledge graph, the updated mainframe source code to identify remaining errors; and
based on identifying an absence of the remaining errors, sending, to a mainframe build and deployment engine, the updated mainframe source code and one or more commands directing the mainframe build and deployment engine to execute a build process on the updated mainframe source code, wherein sending the one or more commands directing the mainframe build and deployment engine causes the mainframe build and deployment engine to automatically execute the build process.

12. The method of claim 11, wherein configuring the dependency knowledge graph comprises communicating with a dependency data storage system to obtain the file dependencies for the mainframe applications.

13. The method of claim 12, wherein configuring the dependency knowledge graph with the file dependencies for the mainframe applications copies the file dependencies to local storage at the computing platform.

14. The method of claim 11, wherein configuring the error knowledge graph is based on historical error and solution information from historical mainframe application builds.

15. The method of claim 11, wherein analyzing the mainframe source code to identify potential errors and corresponding solutions comprises:
verifying, using the dependency knowledge graph, the presence of all necessary file dependencies, and
identifying, using the error knowledge graph, the presence of any historically identified error.

16. The method of claim 11, wherein executing the mainframe build results in an error.

17. The method of claim 16, further comprising:
receiving error information of the error;
tokenizing the error information; and
updating the dependency knowledge graph or the error knowledge graph based on the tokenized error information.

18. The method of claim 11, wherein causing the mainframe source code to be updated comprises sending, to an enterprise computing device, an error notification indicating the corresponding solution.

19. The method of claim 11, wherein causing the mainframe source code to be updated comprises automatically updating the mainframe source code based on the corresponding solution.

20. One or more non-transitory computer-readable media storing instructions that, when executed by a computing platform comprising at least one processor, a communication interface, and memory, cause the computing platform to:
configure a dependency knowledge graph indicating file dependencies for mainframe applications;
configure an error knowledge graph indicating errors and corresponding solutions for the mainframe applications;
receive mainframe source code;
analyze, using the dependency knowledge graph and the error knowledge graph, the mainframe source code to identify potential errors and corresponding solutions;
based on identifying an error in the mainframe source code, cause the mainframe source code to be updated according to the corresponding solution;
analyze, using the dependency knowledge graph and the error knowledge graph, the updated mainframe source code to identify remaining errors; and
based on identifying an absence of the remaining errors, send, to a mainframe build and deployment engine, the updated mainframe source code and one or more commands directing the mainframe build and deployment engine to execute a build process on the updated mainframe source code, wherein sending the one or more commands directing the mainframe build and deployment engine causes the mainframe build and deployment engine to automatically execute the build process.

* * * * *